Nov. 21, 1950 R. S. BOHANNAN 2,531,104
LOAD RESPONSIVE PRESSURE TRANSMITTER
Filed Jan. 18, 1946 2 Sheets-Sheet 1
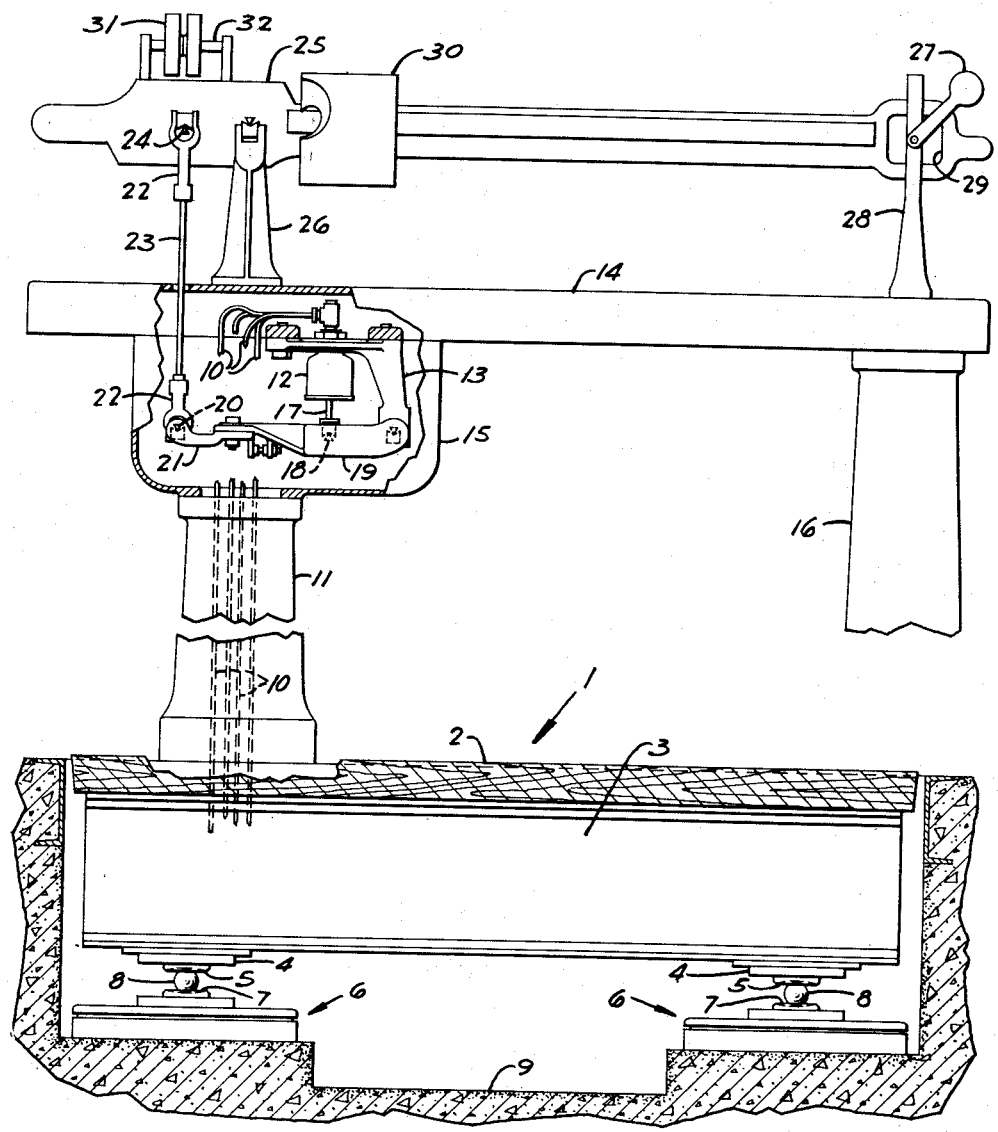
Fig. I
INVENTOR.
Robert S. Bohannan
BY
Marshall & Marshall
ATTORNEYS.

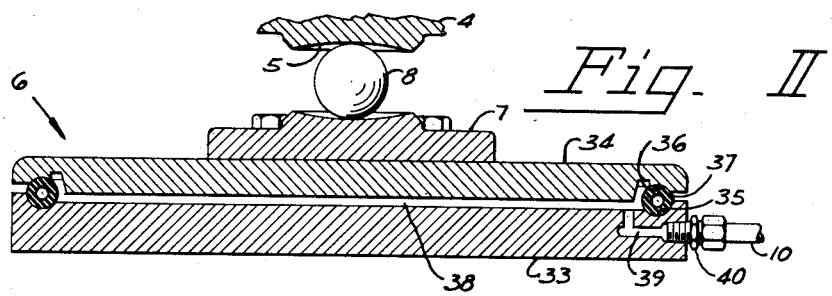
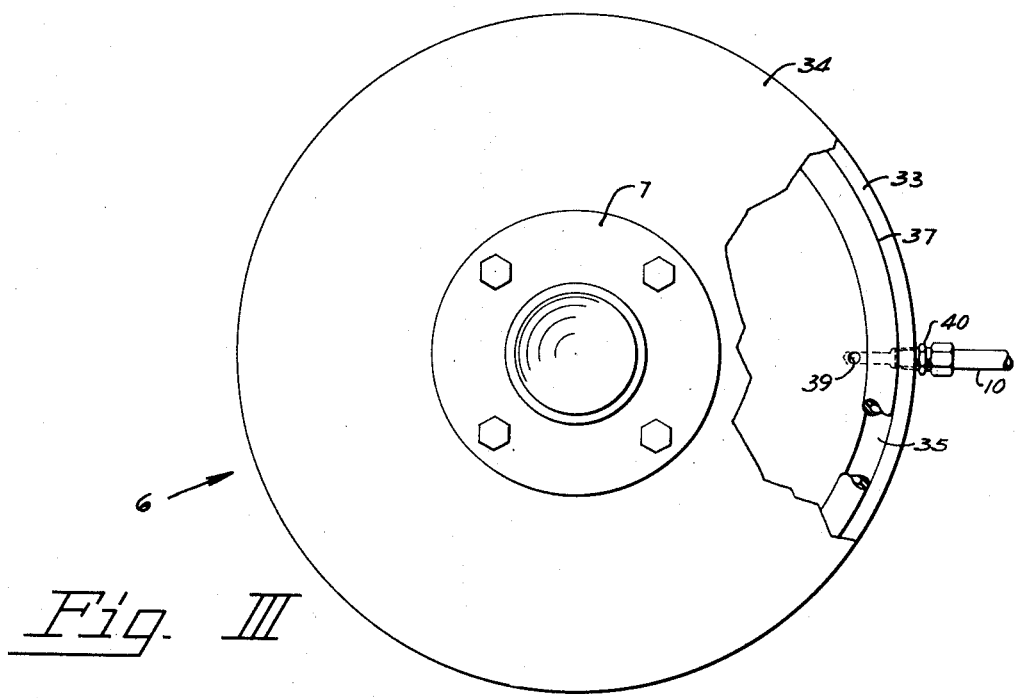
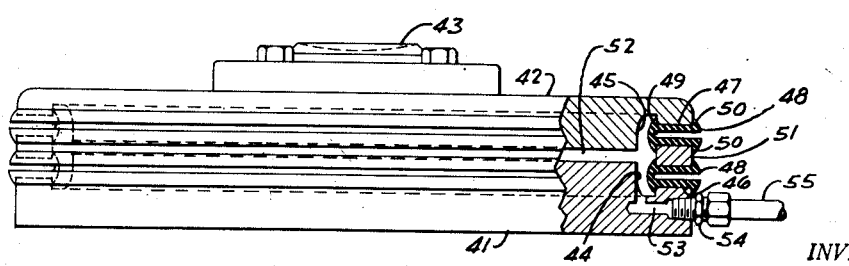

ized Nov. 21, 1950

UNITED STATES PATENT OFFICE 2,531,104

LOAD RESPONSIVE PRESSURE TRANSMITTER

Robert S. Bohannan, Toledo, Ohio, assignor to Toledo Scale Company, Toledo, Ohio, a corporation of New Jersey Application January 18, 1946, Serial No. 641,997

3 Claims. (Cl. 137—156)

This invention relates to hydraulic weighing scales and in particular to a simplified construction for the hydraulic load supporting elements.

When hydraulic force transmitting systems are used in weighing scales it is difficult to build a pressure transmitter which will accurately translate load forces into hydraulic pressure without the capsule mechanically contributing to the support of the load. Because the pressure receiver and load counterbalancing and indicating mechanism at the other end of the hydraulic system is responsive only to hydraulic pressure the indicating mechanism has no way of indicating the amount of the load mechanically supported by the pressure transmitter. It is therefore necessary that the pressure transmitters or capsules be so constructed that either all of the force applied to them is converted into hydraulic pressure or that a precise nonvarying fractional part of the load be so translated. The second condition is practically impossible to attain or if once attained to maintain. Therefore, all of the load must be supported hydraulically and the sealing means employed to confine the hydraulic fluid must be made as flexible as possible so that its contribution to the support of the load is negligible. But flexible sealing means or diaphragms are usually fragile and subject to leakage as well as being difficult to install.

The object of the present invention is to provide a simplified sealing means for a hydraulic pressure transmitter which sealing means is simple to install and is free from leakage. Another object of the invention is to provide a hydraulic capsule construction which may be easily disassembled and assembled and in which the load forces are employed to hold the sealing means in liquid-tight engagement with the plates of the pressure transmitter.

These and other objects and advantages are apparent in the following description in which reference is made to accompanying drawings illustrating preferred embodiments of the invention.

According to the invention an improved hydraulic capsule for use in translating load forces into hydraulic pressure may be constructed by interposing an annular yieldable member between juxtaposed rigid plates. The plates are preferably circular in form although triangular, square or other polygonal shapes may be employed. The yieldable member is interposed between the peripheries of the plates so that a hydraulic chamber of substantial area is formed between the plates. The yieldable member is preferably an inflated rubber tube, although other yieldable tubes, a solid ring of one of the softer grades of rubber, or rings of other cross-sectional configuration may be employed. To improve the liquid seal between the plates and the sealing member the plates are provided with grooves in their opposing faces adjacent their peripheries, which grooves are of such size and shape as to accommodate portions of the sealing member without permitting the plates to contact each other.

Hydraulic capsules constructed according to the invention are shown in the accompanying drawings.

In the drawings:

Figure I is a front elevation, partly in section and with parts broken away, of a hydraulic weighing scale.

Figure II is a vertical section showing the construction of the improved hydraulic capsule.

Figure III is a plan view with parts broken away of the improved capsule.

Figure IV is a side elevation partly in section of a modified form of the invention.

These specific figures and the accompanying description are intended merely to illustrate preferred embodiments of the invention but not to impose limitations on the claims.

A hydraulic weighing scale consists of a load receiver 1 comprising a deck 2 carried on longitudinally extending girders 3. The girders 3 at their ends are supported on plates 4 the lowermost of which are hollowed out to form shallow concave recesses 5. Each corner of the load receiver 1 is supported from a hydraulic capsule 6 having a concave load supporting plate 7 on its upper surface. A steel ball 8 is interposed between the concave portions of the plates 4 and 7, the radius of the ball being considerably less than the concave recesses in the plates so that the load receiver 1 may have appreciable lateral freedom and yet will return to its central position when the laterally deflecting forces are removed. The load receiver 1 and the capsules 6 are installed in a concrete pit 9 with the decking 2 of the load receiver substantially flush with the surrounding area.

The capsules 6, designed to translate forces produced by loads on the load receiver 1 into hydraulic pressure, are individually connected through pipes or tubes 10 leading upwardly through a hollow pedestal 11 and connected to pressure receivers 12 mounted on a bracket 13 secured to the bottom of a weigh beam shelf 14. One end of the weigh beam shelf 14 surmounts a housing 15 which in turn rests on the hollow pedestal 11. The other end of the weigh beam shelf 14 is carried on a separate post 16. The weigh beam shelf 14 may be mounted either adjacent the load receiver 1 or at more remote locations, the lengths of the pipes 10 being varied accordingly.

The hydraulic pressures transmitted through the pipes 10 are converted in the pressure receivers 12 to forces which are transmitted through struts 17 to knife edges 18 mounted in a gathering lever 19. The lever 19 is fulcrumed in a depending portion of the bracket 13 attached to the weigh beam shelf 14. The lever 19 has a power pivot 20 mounted in an adjustable nose iron 21 and connected through stirrups 22 and a steelyard rod 23 to a load knife edge 24 mounted in a weigh beam 25. The weigh beam 25 is fulcrumed on a fulcrum stand 26 erected from the weigh beam shelf 14. The motion of the weigh beam 25 is controlled or arrested by a locking plate controlled by a handle 27 and mounted in a stand 28, the locking plate engaging a trip loop 29 formed in the end of the weigh beam 25. Load forces applied to the weigh beam 25 are counterbalanced by a poise 30 slidably mounted on the weigh beam 25. The scale may be balanced at zero load by adjustment of counterweights 31 threaded on a rod 32 secured to the weigh beam 25.

The capsules 6, serving as supports for the load receiver 1, each comprise a lower plate 33 and an upper plate 34. The lower and upper plates 33 and 34 are circular in shape and made of a rigid material. They are provided around their peripheries with grooves 35 and 36 respectively. A rubber hose 37 cut to the length of the grooves 35 and 36 and having its ends vulcanized together to form a ring is laid in the groove 35 in the lower plate 33 and the upper plate 34 is placed on the assembly with the groove 36 overlying the hose 37. The hose 37 may be inflated to cause it to maintain its shape under the static load of the upper plate 34. Hydraulic fluid confined in a chamber 38 between the plates 33 and 34 serves to support the major portion of a load applied to the capsule. The hydraulic pressure generated in the chamber 38 by loads applied to the capsule is transmitted through drilled passages 39 and coupling 40 to the associated one of the pipes 10.

The cross-sectional shape of the grooves 35 and 36 is designed to conform to the surface of the hose 37 with each groove encompassing substantially more than a quarter but less than half of the periphery of the hose 37. Thus a substantial area for sealing the hydraulic fluid is obtained while still allowing the hose 37 to yield and thereby permit the load applied to the capsule to produce hydraulic pressure in the chamber 38.

It is possible that a capsule constructed with one hose may exhibit too much spring effect, i. e. support so much of the load by the resistance to yielding of the hose 37 that the hydraulic pressure is not a true indication of the load on the capsule.

A capsule employing a hose as a sealing member depends upon the pressure exerted by the plates against the hose to keep the capsule from leaking. It may thus be said to be a "pressure sealed" capsule. The term "pressure sealed" is used to denote a separable structure which when assembled and in use is sealed by the forces exerted by the load. The structure is thus simplified over a conventional capsule in that no fluid-tight clamped joints need be made.

A modified form of pressure sealed capsule is illustrated in Figure IV. The modified capsule comprises a lower plate 41 and an upper plate 42 to which a recessed load supporting member 43 is attached. The capsule plates 41 and 42 are provided with grooves 44 and 45 cut in their opposing faces adjacent their peripheries, the grooves being bounded by square-shouldered rims 46 and 47. Molded rubber rings 48, U-shaped in cross section, are interposed between the rims 46 and 47 with the open end of the U-shaped cross sections opening radially outwardly from the capsule. The rubber rings 48 are fashioned with lips 49 and 50 adapted to engage the square shoulders of the rims 46 and 47. When more than one sealing ring is used, rigid rings such as the ring 51 which are rectangular in cross section are interposed between adjacent rubber sealing rings. While two rubber rings are shown the capsule may be constructed of any reasonable number because the pressures exerted between the rubber sealing rings and the adjacent rigid members is transmitted from one set of sealing members to the next ring in much the same manner as tensile forces are transmitted from link to link through a chain.

Because the resistance to deformation of the sealing rings having the U-shaped cross section is materially less than that of the hose type sealing members it is necessary to cement the sides of the rings to the adjacent rigid parts of the capsule. The cementing prevents the hydraulic fluid from penetrating into the joint between the rubber rings and the capsule plates or rings and forcing the rubber rings out of contact with the plates. The lips 49 and 50 serve to position the rings between the capsule plates and to prevent the fluid from pushing the rings out of position. When the capsule plates 41 and 42 are assembled with the sealing rings 48 a hydraulic chamber 52 is formed between the plates. Hydraulic fluid confined in the chamber 52 serves to support the major part of the load applied to the capsule and the pressure developed in the hydraulic fluid in response to the load is transmitted through drilled passages 53 and a coupling 54 to a pipe 55 leading to a pressure receiver operatively connected to counterbalancing and indicating mechanism.

The improved sealing means embodying the invention of which preferred forms are illustrated in the drawings make extensive clamping unnecessary in constructing a hydraulic pressure transmitter. This simplification makes it comparatively easy to rebuild a capsule which may require servicing because the parts are held in operative relation primarily by the load forces being supported by the capsule.

Having described the invention, I claim:

1. A hydraulic capsule for use in a weighing scale, the capsule comprising a pair of plates separated by a hydraulic fluid, a hose-like yieldable member interposed between the peripheries of the plates and held in fluid-tight engagement by load forces applied to the capsule, and means for hydraulically connecting the space between the plates to a pressure receiver.

2. A hydraulic capsule for use in a weighing scale, the capsule comprising a pair of plates separated by a hydraulic fluid, an inflated hose held interposed between the peripheries of the plates by load forces to confine the hydraulic fluid, and means for hydraulically connecting the space between the plates to a pressure receiver.

3. A pressure transmitter for a hydraulic weighing scale, the transmitter comprising a pair of plates each having a groove cut in a face near its periphery, the grooves being in registry when the plates are juxtaposed, a yieldable member interposed between the plates and having portions lying in the grooves for confining hydraulic fluid in the space between the plates, and means for hydraulically connecting a pressure receiver to the space between the plates.

ROBERT S. BOHANNAN.

REFERENCES CITED

The following references are of record in the file of this patent:

UNITED STATES PATENTS

| Number | Name | Date |
|---|---|---|
| 1,446,439 | Lieberman | Feb. 20, 1923 |
| 2,096,066 | Saforcada | Oct. 19, 1937 |
| 2,411,251 | Feld | Nov. 19, 1946 |